United States Patent
Nakagawa et al.

(10) Patent No.: US 10,753,005 B2
(45) Date of Patent: *Aug. 25, 2020

(54) STEEL SHEET FOR CANS AND PRODUCTION METHOD FOR STEEL SHEET FOR CANS

(71) Applicant: JFE Steel Corporation, Tokyo (JP)

(72) Inventors: Yusuke Nakagawa, Tokyo (JP); Takeshi Suzuki, Tokyo (JP); Mikito Suto, Tokyo (JP); Katsumi Kojima, Tokyo (JP); Yuya Baba, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 16/061,079

(22) PCT Filed: Dec. 1, 2016

(86) PCT No.: PCT/JP2016/085796
§ 371 (c)(1),
(2) Date: Jun. 11, 2018

(87) PCT Pub. No.: WO2017/098994
PCT Pub. Date: Jun. 15, 2017

(65) Prior Publication Data
US 2018/0355496 A1    Dec. 13, 2018

(30) Foreign Application Priority Data

Dec. 11, 2015  (JP) ................. 2015-241871

(51) Int. Cl.
*C25D 3/04*     (2006.01)
*C25D 5/14*     (2006.01)
(Continued)

(52) U.S. Cl.
CPC .............. *C25D 3/04* (2013.01); *B32B 15/013* (2013.01); *B32B 15/04* (2013.01); *B32B 15/043* (2013.01); *B32B 15/18* (2013.01); *C23C 28/30* (2013.01); *C23C 28/32* (2013.01); *C23C 28/322* (2013.01); *C23C 28/34* (2013.01); *C23C 28/345* (2013.01); *C23C 28/40* (2013.01); *C23C 30/00* (2013.01); *C23C 30/005* (2013.01); *C25D 3/06* (2013.01); *C25D 3/08* (2013.01); *C25D 5/10* (2013.01); *C25D 5/12* (2013.01); *C25D 5/14* (2013.01); *C25D 5/16* (2013.01); *C25D 5/36* (2013.01); *C25D 7/04* (2013.01); *C25D 7/06* (2013.01); *C25D 9/06* (2013.01); *C25D 9/10* (2013.01); *C25D 11/38* (2013.01); *C25D 13/02* (2013.01); *C25D 13/14* (2013.01); *C25D 21/12* (2013.01); *C25F 3/08* (2013.01); *Y10T 428/12847* (2015.01); *Y10T 428/12854* (2015.01); *Y10T 428/12972* (2015.01); *Y10T 428/12979* (2015.01); *Y10T 428/12993* (2015.01); *Y10T 428/24942* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
CPC ........... C25F 3/08; C25D 21/12; C25D 11/38; C25D 3/04; C25D 3/08; C25D 3/06; C25D 7/06; C25D 7/04; C25D 13/14; C25D 13/02; C25D 9/06; C25D 9/10; C25D 5/12; C25D 5/14; C25D 5/16; C25D 5/10; C25D 5/36; C23C 28/322; C23C 28/345; C23C 28/32; C23C 28/30; C23C 28/34; C23C 28/40; C23C 30/00; C23C 30/005; Y10T 428/12847; Y10T 428/12854; Y10T 428/12972; Y10T 428/12979; Y10T 428/12993; Y10T 428/24967; Y10T 428/24942; Y10T 428/263; Y10T 428/264; Y10T 428/265; Y10T 428/26
See application file for complete search history.

(56) References Cited

U.S. PATENT DOCUMENTS 4,687,713 A * 8/1987 Ogata .................... C25D 11/38
                                              205/142
2018/0363160 A1* 12/2018 Nakagawa ............. C25D 11/38

FOREIGN PATENT DOCUMENTS

| EP | 0 121 817 A1 | 10/1984 |
|----|--------------|---------|
| JP | S61-281899 A | 12/1986 |
| JP | 63-186894 A | 8/1988 |
| JP | 3-177599 A | 8/1991 |
| JP | 3-229897 A | 10/1991 |
| JP | 4-187797 A | 7/1992 |
| JP | 8-209392 A | 8/1996 |
| JP | H11-189898 A | 7/1999 |

OTHER PUBLICATIONS

Japanese Office Action dated Jan. 16, 2018, of corresponding Japanese Application No. 2017-513816 along with a Concise Statement of Relevance in English.

(Continued)

*Primary Examiner* — Michael E. La Villa
(74) *Attorney, Agent, or Firm* — DLA Piper LLP (US)

(57) ABSTRACT

A steel sheet for cans has, on the surface thereof, in order from the steel sheet side, a chromium metal layer and a hydrous chromium oxide layer. The chromium metal layer is deposited in an amount of 65-200 mg/m$^2$, and the hydrous chromium oxide layer is deposited in an amount of 3-15 mg/m$^2$ in terms of chromium. The chromium metal layer includes: a flat chromium metal layer that has a thickness of at least 7 nm; and a granular chromium metal layer that includes granular protrusions that are formed on the surface of the flat chromium metal layer. The maximum grain size of the granular protrusions is 100 nm or smaller. The number density of the granular protrusions per unit area is 10/μm$^2$ or higher.

17 Claims, No Drawings

(51) Int. Cl.

| | | |
|---|---|---|
| C25D 5/16 | (2006.01) | |
| C25D 9/10 | (2006.01) | |
| C25D 7/04 | (2006.01) | |
| C23C 28/00 | (2006.01) | |
| C25D 5/12 | (2006.01) | |
| C25D 13/02 | (2006.01) | |
| C25D 9/06 | (2006.01) | |
| C25D 3/08 | (2006.01) | |
| C25D 13/14 | (2006.01) | |
| C25D 21/12 | (2006.01) | |
| C25F 3/08 | (2006.01) | |
| C25D 11/38 | (2006.01) | |
| C25D 7/06 | (2006.01) | |
| C23C 30/00 | (2006.01) | |
| C25D 5/10 | (2006.01) | |
| C25D 5/36 | (2006.01) | |
| C25D 3/06 | (2006.01) | |
| B32B 15/04 | (2006.01) | |
| B32B 15/01 | (2006.01) | |
| B32B 15/18 | (2006.01) | |

(56) References Cited

OTHER PUBLICATIONS

Taiwanese Office Action dated Jun. 16, 2017, of corresponding Taiwanese Application No. 105140900 along with the Search Report in English.
Japanese Office Action dated Aug. 28, 2018, of counterpart Japanese Application No. 2017-513816 along with a Concise Statement of Relevance of office action in English.
Office Action dated Sep. 6, 2019, of counterpart Chinese Application No. 201680071966.1, including a Search Report in English.
Office Action dated Oct. 23, 2019, of counterpart Korean Application No. 10-2018-7016438, along with a Search Report in English.
Extended European Search Report dated Sep. 27, 2018, of counterpart European Application No. 16872892.1.

* cited by examiner

STEEL SHEET FOR CANS AND PRODUCTION METHOD FOR STEEL SHEET FOR CANS

TECHNICAL FIELD

This disclosure relates to a steel sheet for cans and a method of manufacturing the same.

BACKGROUND

Cans that serve as containers for beverages and foods are useful for storing the contents over a long period of time and are therefore used all over the world. Cans are roughly classified into the following two types: a two-piece can obtained by subjecting a metal sheet to drawing, ironing, stretching and bending to integrally form a can bottom and a can body and then joining the can body with a top lid by seaming; and a three-piece can obtained by machining a metal sheet into a tubular shape, welding the tubular metal sheet by a wire seam process to form a can body, and then joining the opposite ends of the can body separately with lids by seaming.

Conventionally, a tin-plated steel sheet (so-called tin plate) has been widely used as a steel sheet for cans. Nowadays, however, an electrolytic chromate treated steel sheet (hereinafter also called tin free steel (TFS)) having a chromium metal layer and a hydrated chromium oxide layer costs much less and has better paint adhesion than tin plates and is therefore expanding its range of application.

In connection with reduction in washing waste liquid and $CO_2$ for environmental reasons, cans using a steel sheet laminated with an organic resin film such as PET (polyethylene terephthalate) is drawing attention as an alternative technique that enables a coating process and a baking process to be omitted, and also in this context, the use of TFS having excellent adhesion to an organic resin film is expected to continuously expand.

Meanwhile, since TFS is inferior to a tin plate in weldability, a hydrated chromium oxide layer which is an insulating coating at the surface layer is mechanically polished and removed immediately before welding to thereby make welding possible at present.

In industrial production, however, there are many problems in that, for instance, metal powder generated through polishing may be mixed in the contents, a burden of maintenance such as cleaning of can manufacturing equipment increases, and the risk of a fire caused by metal powder increases.

To address those issues, a technique of welding TFS without polishing is proposed by, for instance, JP 63-186894 A. In the technique disclosed by JP 63-186894 A, anodic electrolysis treatment is carried out between prior-stage and posterior-stage cathodic electrolysis treatments to thereby form a number of defect portions in a chromium metal layer, and then chromium metal is formed into a shape of granular protrusions through the posterior-stage cathodic electrolysis treatment. According to that technique, in welding, the granular protrusions of chromium metal destroy a hydrated chromium oxide layer that is a factor inhibiting welding at the surface layer, thereby reducing contact resistance and improving weldability.

We studied steel sheets for cans specifically described in JP 63-186894 A and found that, in some cases, they had poor surface appearance.

It could therefore be helpful to provide a steel sheet for cans having excellent surface appearance and a method of manufacturing the same.

SUMMARY

We found that a decrease in the diameter of chromium metal granular protrusions improves surface appearance.

We thus provide:

[1] A steel sheet for cans comprising, on a surface of a steel sheet, a chromium metal layer and a hydrated chromium oxide layer stacked in this order from a steel sheet side, wherein the chromium metal layer has a coating weight of 65 to 200 mg/m$^2$, wherein the hydrated chromium oxide layer has a coating weight of 3 to 15 mg/m$^2$ in terms of chromium amount, and wherein the chromium metal layer includes:

a flat chromium metal layer with a thickness of not less than 7 nm; and a granular chromium metal layer having granular protrusions formed on a surface of the flat chromium metal layer, the granular protrusions having a maximum diameter of not more than 100 nm and a number density per unit area of not less than 10 protrusions/μm$^2$.

[2] The steel sheet for cans according to [1] above, wherein the granular protrusions have a maximum diameter of not more than 50 nm.

[3] The steel sheet for cans according to [2] above, wherein the granular protrusions have a maximum diameter of not more than 30 nm.

[4] The steel sheet for cans according to any one of [1] to [3] above, wherein the granular protrusions have a number density per unit area of not less than 50 protrusions/μm$^2$.

[5] The steel sheet for cans according to [4] above, wherein the granular protrusions have a number density per unit area of not less than 100 protrusions/μm$^2$.

[6] The steel sheet for cans according to any one of [1] to [5] above, wherein the flat chromium metal layer has a thickness of not less than 10 nm.

[7] A method of manufacturing a steel sheet for cans for obtaining the steel sheet for cans according to any one of [1] to [6] above, the method comprising:

subjecting a steel sheet to prior-stage cathodic electrolysis treatment using an aqueous solution that contains Cr in an amount of not less than 0.5 mol/L and F in an amount of more than 0.10 mol/L and is free of sulfuric acid except for sulfuric acid inevitably incorporated therein, followed by anodic electrolysis treatment at an electric quantity density of not less than 0.1 C/dm$^2$ but less than 5.0 C/dm$^2$, and then by posterior-stage cathodic electrolysis treatment.

[8] The method of manufacturing a steel sheet for cans according to [7] above, wherein the posterior-stage cathodic electrolysis treatment is a final electrolysis treatment.

[9] The method of manufacturing a steel sheet for cans according to [7] or [8] above, wherein the aqueous solution used in the prior-stage cathodic electrolysis treatment, the anodic electrolysis treatment and the posterior-stage cathodic electrolysis treatment comprises only one type of aqueous solution.

We provide a steel sheet for cans having excellent surface appearance and a method of manufacturing the same.

DETAILED DESCRIPTION

Steel Sheet for Cans

Our steel sheet for cans includes, on a surface of a steel sheet, a chromium metal layer and a hydrated chromium oxide layer stacked in this order from the steel sheet side, the chromium metal layer having a coating weight of 50 to 200 mg/m$^2$, and the hydrated chromium oxide layer having a coating weight of 3 to 15 mg/m$^2$ in terms of chromium amount. The chromium metal layer includes: a flat chromium metal layer with a thickness of not less than 7 nm; and a granular chromium metal layer having granular protrusions formed on a surface of the flat chromium metal layer, the granular protrusions having a maximum diameter of not more than 100 nm and a number density per unit area of not less than 10 protrusions/μm$^2$.

When the maximum diameter of the granular protrusions of the granular chromium metal layer is 100 nm or less, the steel sheet for cans can have excellent surface appearance.

The term "coating weight" refers to the coating weight per one side of a steel sheet.

The constituent elements are described in detail below.

Steel Sheet

The type of the steel sheet is not particularly limited. In general, steel sheets used as materials for containers (e.g., a low carbon steel sheet and an ultra low carbon steel sheet) can be used. A manufacturing method of the steel sheet, a material thereof and the like are also not particularly limited. The steel sheet is manufactured through a process starting with a typical billet manufacturing process, followed by such processes as hot rolling, pickling, cold rolling, annealing and temper rolling.

Chromium Metal Layer

The steel sheet for cans has the chromium metal layer on a surface of the foregoing steel sheet.

The role of chromium metal in typical TFS is to suppress the exposure of a surface of the steel sheet serving as the basic material and thereby improve corrosion resistance. When the amount of chromium metal is too small, the steel sheet is inevitably exposed, and this may lead to poor corrosion resistance.

The coating weight of the chromium metal layer is not less than 65 mg/m$^2$ because this leads to excellent corrosion resistance of the steel sheet for cans, and is preferably not less than 70 mg/m$^2$ and more preferably not less than 80 mg/m$^2$ because this leads to further excellent corrosion resistance.

In contrast, when the amount of chromium metal is too large, high-melting chromium metal is to cover the entire surface of the steel sheet, and this induces a significant decrease in weld strength in welding and a significant generation of dust, which may lead to poor weldability.

The coating weight of the chromium metal layer is not more than 200 mg/m$^2$ because this leads to excellent weldability of the steel sheet for cans, and is preferably not more than 180 mg/m$^2$ and more preferably not more than 160 mg/m$^2$ because this leads to further excellent weldability.

Measurement Methods of Coating Weights

The coating weight of the chromium metal layer and the coating weight of the hydrated chromium oxide layer (described later) in terms of chromium amount are measured as follows.

First, for the steel sheet for cans having formed thereon the chromium metal layer and the hydrated chromium oxide layer, the amount of chromium (total amount of chromium) is measured with an X-ray fluorescence device. Next, the steel sheet for cans is subjected to alkaline treatment, i.e., is immersed in 6.5N—NaOH at 90° C. for 10 minutes, and then, again, the amount of chromium (amount of chromium after alkaline treatment) is measured with an X-ray fluorescence device. The amount of chromium after alkaline treatment is taken as the coating weight of the chromium metal layer.

Thereafter, the equation (amount of alkali-soluble chromium)=(total amount of chromium)−(amount of chromium after alkaline treatment) is calculated, and the amount of alkali-soluble chromium is taken as the coating weight of the hydrated chromium oxide layer in terms of chromium amount.

The chromium metal layer as above includes the flat chromium metal layer and the granular chromium metal layer having the granular protrusions formed on a surface of the flat chromium metal layer.

Next, those layers included in the chromium metal layer are described in detail.

Flat Chromium Metal Layer

The flat chromium metal layer mainly improves corrosion resistance by covering a surface of the steel sheet.

The flat chromium metal layer needs to have, in addition to corrosion resistance which is generally required of TFS, a sufficient thickness such that the flat chromium metal layer will not be destroyed by granular protrusion-shaped chromium metal provided at the surface layer and hence the steel sheet is not exposed when the steel sheet for cans inevitably contacts other steel sheets for cans during handling.

In connection with this, we conducted a rubbing test of a steel sheet for cans with another steel sheet for cans to check rust resistance and found that, when the flat chromium metal layer has a thickness of not less than 7 nm, rust resistance is excellent. More specifically, the thickness of the flat chromium metal layer is not less than 7 nm because this leads to excellent rust resistance of the steel sheet for cans, and is preferably not less than 9 nm and more preferably not less than 10 nm because this leads to further excellent rust resistance.

Meanwhile, the upper limit of the thickness of the flat chromium metal layer is not particularly limited and is, for instance, not more than 20 nm and preferably not more than 15 nm.

Measurement Method of Thickness

The thickness of the flat chromium metal layer is measured as follows.

First, a cross section sample of a steel sheet for cans having formed thereon a chromium metal layer and a hydrated chromium oxide layer is produced by a focused ion beam (FIB) method and observed at a magnification of 20000× with a scanning transmission electron microscope (TEM). Next, in a sectional shape observation on a bright-field image, focusing on a portion where only a flat chromium metal layer is present with no granular protrusions, a line analysis is conducted by energy dispersive X-ray spectrometry (EDX) to obtain intensity curves (horizontal axis: distance, vertical axis: intensity) of chromium and iron, and those curves are used to determine the thickness of the flat chromium metal layer. To be more specific, in the chromium intensity curve, the point at which the intensity is 20% of the maximum is taken as the uppermost layer, while the cross point with the iron intensity curve is taken as the boundary point with iron, and the distance between those two points is taken as the thickness of the flat chromium metal layer.

The coating weight of the flat chromium metal layer is preferably not less than 10 mg/m$^2$, more preferably not less than 30 mg/m$^2$ and even more preferably not less than 40 mg/m$^2$ because this leads to excellent rust resistance of the steel sheet for cans.

Granular Chromium Metal Layer

The granular chromium metal layer is a layer having the granular protrusions formed on a surface of the flat chromium metal layer described above and mainly improves weldability by reducing contact resistance between to-be-welded portions of the steel sheet for cans. The assumed mechanism of reduction in contact resistance is described below.

The hydrated chromium oxide layer covering the chromium metal layer is a non-conductive coating and therefore has higher electric resistance than chromium metal so that the hydrated chromium oxide layer works as a factor inhibiting welding. By forming the granular protrusions on a surface of the chromium metal layer, the granular protrusions destroy the hydrated chromium oxide layer using the surface pressure applied when to-be-welded portions of the steel sheet for cans come into contact with each other in welding, and the granular protrusions become current-carrying points of welding current, whereby the contact resistance greatly decreases.

When the number of the granular protrusions of the granular chromium metal layer is too small, current-carrying points in welding should decrease in number, and this may prevent the contact resistance from being lowered, resulting in poor weldability.

The number density of the granular protrusions per unit area is not less than 10 protrusions/μm$^2$ because this leads to excellent weldability of the steel sheet for cans, and is preferably not less than 15 protrusions/μm$^2$, more preferably not less than 20 protrusions/μm$^2$, even more preferably not less than 30 protrusions/μm$^2$, particularly preferably not less than 50 protrusions/μm$^2$ and most preferably not less than 100 protrusions/μm$^2$ because this leads to further excellent weldability.

Because too high a number density of the granular protrusions per unit area may affect the color tone or the like, the upper limit of the number density per unit area is preferably not more than 10000 protrusions/μm$^2$, more preferably not more than 5000 protrusions/μm$^2$, even more preferably not more than 1000 protrusions/μm$^2$ and particularly preferably not more than 800 protrusions/μm$^2$ to achieve further excellent surface appearance of the steel sheet for cans.

We found that, when the maximum diameter of the granular protrusions of the chromium metal layer is too large, this affects the hue or the like of the steel sheet for cans, and a brown pattern appears in some cases, resulting in a poor surface appearance. The possible reasons of the above are, for example, as follows: the granular protrusions absorb short-wavelength (blue) light and, accordingly, reflected light thereof is attenuated so that a reddish brown color appears; the granular protrusions diffuse reflected light so that the overall reflectance decreases and the color gets darker.

Therefore, the maximum diameter of the granular protrusions of the granular chromium metal layer is 100 nm or less. As a result, the steel sheet for cans can have an excellent surface appearance. This is probably because the granular protrusions with a smaller diameter suppress absorption of short-wavelength light and suppress dispersion of reflected light.

The maximum diameter of the granular protrusions of the granular chromium metal layer is preferably not more than 80 nm, more preferably not more than 50 nm and even more preferably not more than 30 nm because this leads to further excellent surface appearance of the steel sheet for cans.

The lower limit of the maximum diameter is not particularly limited and is preferably, for instance, not less than 10 nm.

Measurement Methods of Diameter of Granular Protrusions and Number Density Thereof Per Unit Area The diameter of the granular protrusions of the granular chromium metal layer and the number density thereof per unit area are measured as follows.

First, a surface of the steel sheet for cans having formed thereon the chromium metal layer and the hydrated chromium oxide layer is subjected to carbon deposition to produce an observation sample by an extraction replica method. Subsequently, a micrograph of the sample is taken at a magnification of 20000× with a scanning transmission electron microscope (TEM), the taken micrograph is binarized using software (trade name: ImageJ) and subjected to image analysis, and the diameter (as a true circle-equivalent value) and the number density per unit area are determined through back calculation of the area occupied by the granular protrusions. The maximum diameter is the diameter that is the maximum in observation fields as obtained by taking micrographs of five fields at a magnification of 20000×, and the number density per unit area is the average of number densities in the five fields.

Hydrated Chromium Oxide Layer

Hydrated chromium oxide is deposited along with chromium metal on a surface of the steel sheet and mainly improves corrosion resistance. The coating weight of the hydrated chromium oxide layer in terms of chromium amount is at least 3 mg/m$^2$ for the purpose of ensuring corrosion resistance of the steel sheet for cans.

Meanwhile, hydrated chromium oxide is inferior to chromium metal in conductivity and, accordingly, too much hydrated chromium oxide leads to excessive resistance in welding, which may cause generation of dust, occurrence of splashing, and a variety of weld defects such as blowhole formation associated with overwelding, thus resulting in poor weldability of the steel sheet for cans.

Therefore, the coating weight of the hydrated chromium oxide layer in terms of chromium amount is not more than 15 mg/m$^2$ because this leads to excellent weldability of the steel sheet for cans, and is preferably not more than 13 mg/m$^2$, more preferably not more than 10 mg/m$^2$ and still more preferably not more than 8 mg/m$^2$ because this leads to further excellent weldability.

The measurement method of the coating weight of the hydrated chromium oxide layer in terms of chromium amount is as described above.

Method of Manufacturing Steel Sheet for Cans

Next, the method of manufacturing steel sheet for cans is described.

The method of manufacturing steel sheet for cans (hereinafter also simply called "manufacturing method") is a method of manufacturing the foregoing steel sheet for cans, the method comprising subjecting a steel sheet to prior-stage cathodic electrolysis treatment using an aqueous solution that contains Cr in an amount of not less than 0.5 mol/L and F in an amount of more than 0.10 mol/L and is free of sulfuric acid except for sulfuric acid inevitably incorporated therein, followed by anodic electrolysis treatment at an electric quantity density of not less than 0.1 C/dm$^2$ but less than 5.0 C/dm$^2$, and then by posterior-stage cathodic electrolysis treatment.

Typically, in cathodic electrolysis treatment in an aqueous solution containing a hexavalent chromium compound, a reduction reaction occurs at a steel sheet surface, whereby chromium metal is deposited, and hydrated chromium oxide that is an intermediate product before becoming chromium metal is deposited on the chromium metal surface. This hydrated chromium oxide is unevenly dissolved through intermittent electrolysis treatment or long time immersion in an aqueous solution of a hexavalent chromium compound, and in the subsequent cathodic electrolysis treatment, chromium metal granular protrusions are formed.

Since the anodic electrolysis treatment is carried out between the two cathodic electrolysis treatments, chromium metal is dissolved over the entire surface of the steel sheet at multiple sites, and those sites become starting points of the formation of the chromium metal granular protrusions in the subsequent cathodic electrolysis treatment. The flat chromium metal layer is deposited in the prior-stage cathodic electrolysis treatment which is cathodic electrolysis treatment carried out before the anodic electrolysis treatment, and the granular chromium metal layer (granular protrusions) is deposited in the posterior-stage cathodic electrolysis treatment which is cathodic electrolysis treatment carried out after the anodic electrolysis treatment.

The amounts of deposition of the layers can be controlled by electrolysis conditions in the respective electrolysis treatments.

The aqueous solution and the electrolysis treatments used in the manufacturing method are described in detail below.

Aqueous Solution

The aqueous solution used in the manufacturing method is an aqueous solution that contains Cr in an amount of not less than 0.5 mol/L and F in an amount of more than 0.10 mol/L and is free of sulfuric acid except for sulfuric acid inevitably incorporated therein.

The amount of F in the aqueous solution influences dissolution of hydrated chromium oxide during immersion and dissolution of chromium metal during the anodic electrolysis treatment, and thus greatly influences the form of chromium metal deposited in the subsequent cathodic electrolysis treatment. Sulfuric acid also brings about the same effect. However, the effect generated by sulfuric acid is excessive and, as a consequence, uneven dissolution of hydrated chromium oxide causes local formation of huge granular protrusions, and dissolution of chromium metal extremely proceeds during the anodic electrolysis treatment. Thus, it may be difficult to form fine granular protrusions. Therefore, the aqueous solution is free of sulfuric acid except for sulfuric acid inevitably incorporated therein.

Sulfuric acid is inevitably incorporated in certain raw materials such as chromium trioxide in the industrial production process so that the use of such raw materials results in inevitable incorporation of sulfuric acid into the resulting aqueous solution. The amount of sulfuric acid inevitably incorporated in the aqueous solution is preferably less than 0.001 mol/L and more preferably less than 0.0001 mol/L.

The aqueous solution contains Cr in an amount of not less than 0.5 mol/L because this leads to highly efficient and stable deposition of chromium metal over a long period of time.

In addition, the aqueous solution contains F in an amount of more than 0.10 mol/L. As a result, even and fine dissolution of chromium metal proceeds over the entire surface during the anodic electrolysis treatment and, consequently, generation sites at which fine granular protrusions are generated in the posterior-stage cathodic electrolysis treatment can be obtained.

It is preferable that one type of aqueous solution be solely used in the prior-stage cathodic electrolysis treatment, the anodic electrolysis treatment and the posterior-stage cathodic electrolysis treatment.

Hexavalent Chromium Compound

The aqueous solution preferably contains a hexavalent chromium compound. The hexavalent chromium compound contained in the aqueous solution is not particularly limited, and examples thereof include chromium trioxide ($CrO_3$), dichromates such as potassium dichromate ($K_2Cr_2O_7$), and chromates such as potassium chromate ($K_2CrO_4$).

The hexavalent chromium compound content of the aqueous solution is preferably 0.5 to 5.0 mol/L and more preferably 0.5 to 3.0 mol/L in the amount of Cr.

Fluorine-Containing Compound

The aqueous solution preferably contains a fluorine-containing compound. The fluorine-containing compound contained in the aqueous solution is not particularly limited, and examples thereof include hydrofluoric acid (HF), potassium fluoride (KF), sodium fluoride (NaF), hydrosilicofluoric acid ($H_2SiF_6$) and/or salts thereof. Examples of salts of hydrosilicofluoric acid include sodium silicofluoride ($Na_2SiF_6$), potassium silicofluoride ($K_2SiF_6$), and ammonium silicofluoride (($NH_4)_2SiF_6$).

The fluorine-containing compound content of the aqueous solution is preferably more than 0.10 mol/L but not more than 4.0 mol/L, more preferably 0.15 to 3.0 mol/L and still more preferably 0.20 to 2.0 mol/L in the amount of F.

The temperature of the aqueous solution in each electrolysis treatment is preferably 20° C. to 80° C. and more preferably 40° C. to 60° C.

Prior-Stage Cathodic Electrolysis Treatment

Cathodic electrolysis treatment is carried out to deposit chromium metal and hydrated chromium oxide.

The electric quantity density (the product of the current density and the current application time) in the prior-stage cathodic electrolysis treatment is preferably 20 to 50 $C/dm^2$ and more preferably 25 to 45 $C/dm^2$ for the purpose of achieving a proper amount of deposition and ensuring an appropriate thickness of the flat chromium metal layer.

The current density (unit: $A/dm^2$) and the current application time (unit: sec.) are suitably set based on the foregoing electric quantity density.

The prior-stage cathodic electrolysis treatment need not be continuous electrolysis treatment. In other words, the prior-stage cathodic electrolysis treatment may be intermittent electrolysis treatment in which an immersion period with no current application is inevitably present since electrolysis is carried out with separate electrodes in industrial production. In intermittent electrolysis treatment, the total electric quantity density preferably falls within the foregoing ranges.

Anodic Electrolysis Treatment

The anodic electrolysis treatment dissolves chromium metal deposited in the prior-stage cathodic electrolysis treatment to form generation sites of the chromium metal granular protrusions to be generated in the posterior-stage cathodic electrolysis treatment. When dissolution excessively proceeds in the anodic electrolysis treatment, this may cause a decreased number of generation sites and hence lower number density of the granular protrusions per unit area, variation in distribution of the granular protrusions due to uneven progression of dissolution, and a small thickness of the flat chromium metal layer of less than 7 nm.

The chromium metal layer formed in the prior-stage cathodic electrolysis treatment and the anodic electrolysis treatment is mainly composed of the flat chromium metal layer. To have the flat chromium metal layer with a thickness of 7 nm or more, it is necessary to ensure the chromium metal amount of not less than 50 mg/m² after the prior-stage cathodic electrolysis treatment and the anodic electrolysis treatment.

From the foregoing factors, the electric quantity density (the product of the current density and the current application time) in the anodic electrolysis treatment is not less than 0.1 C/dm² but less than 5.0 C/dm². The lower limit of the electric quantity density in the anodic electrolysis treatment is preferably more than 0.3 dm². The upper limit of the electric quantity density in the anodic electrolysis treatment is preferably not more than 3.0 C/dm² and more preferably not more than 2.0 C/dm².

The current density (unit: A/dm²) and the current application time (unit: sec.) are suitably set based on the foregoing electric quantity density.

The anodic electrolysis treatment need not be continuous electrolysis treatment. In other words, the anodic electrolysis treatment may be intermittent electrolysis treatment because electrolysis is carried out separately for each set of electrodes in industrial production and accordingly, an immersion period with no current application is inevitably present. In intermittent electrolysis treatment, the total electric quantity density preferably falls within the foregoing ranges.

Posterior-Stage Cathodic Electrolysis Treatment

As described above, cathodic electrolysis treatment is carried out to deposit chromium metal and hydrated chromium oxide. In particular, the posterior-stage cathodic electrolysis treatment allows the chromium metal granular protrusions to be generated at the foregoing generation sites serving as starting points. In this process, when the electric quantity density is too high, the chromium metal granular protrusions may excessively grow, leading to a coarse grain size.

For this reason, in the posterior-stage cathodic electrolysis treatment, the electric quantity density is preferably less than 30.0 C/dm², more preferably not more than 25.0 C/dm² and still more preferably not more than 7.0 C/dm². The lower limit thereof is not particularly limited and is preferably not less than 1.0 C/dm² and more preferably not less than 2.0 C/dm².

The current application time (unit: sec.) is suitably set based on the foregoing current density and electric quantity density.

The posterior-stage cathodic electrolysis treatment need not be continuous electrolysis treatment. In other words, the posterior-stage cathodic electrolysis treatment may be intermittent electrolysis treatment because electrolysis is carried out separately for each set of electrodes in industrial production and accordingly, an immersion period with no current application is inevitably present. In intermittent electrolysis treatment, the total electric quantity density preferably falls within the foregoing ranges.

Preferably, the posterior-stage cathodic electrolysis treatment is the final electrolysis treatment. In other words, preferably, the posterior-stage cathodic electrolysis treatment is not followed by another electrolysis treatment (cathodic or anodic electrolysis treatment, particularly cathodic electrolysis treatment). More preferably, as the electrolysis treatments, only the prior-stage cathodic electrolysis treatment, the anodic electrolysis treatment and the posterior-stage cathodic electrolysis treatment are carried out using one type of aqueous solution.

When the posterior-stage cathodic electrolysis treatment is the final electrolysis treatment, the coating weight of the hydrated chromium oxide layer in terms of chromium amount and the maximum diameter of the granular protrusions of the granular chromium metal layer can be prevented from excessively increasing.

Even when the posterior-stage cathodic electrolysis treatment is the final electrolysis treatment, however, the posterior-stage cathodic electrolysis treatment may be followed by immersion treatment in which the steel sheet is immersed in a hexavalent chromium compound-containing aqueous solution in an electroless state for the purpose of controlling the amount of hydrated chromium oxide layer and reforming the hydrated chromium oxide layer. Even with the immersion treatment as above, the thickness of the flat chromium metal layer and the diameter and number density of the granular protrusions of the granular chromium metal layer are not at all affected thereby.

The hexavalent chromium compound contained in the aqueous solution used in the immersion treatment is not particularly limited, and examples thereof include chromium trioxide ($CrO_3$), dichromates such as potassium dichromate ($K_2Cr_2O_7$), and chromates such as potassium chromate ($K_2CrO_4$).

EXAMPLES

Our steel sheets and methods are specifically described below by way of examples. However, this disclosure should not be construed as being limited to the following examples.

Manufacture of Steel Sheet for Cans

Each steel sheet (tempered grade: T4CA) as produced to a sheet thickness of 0.22 mm was subjected to normal degreasing and pickling. Subsequently, the relevant aqueous solution shown in Table 1 below was circulated by a pump at a rate equivalent to 100 mpm in a fluid cell, and electrolysis treatment was carried out using lead electrodes under the conditions shown in Table 2 below, thereby manufacturing a steel sheet for cans that is TFS. The steel sheet for cans as manufactured was rinsed with water and dried by a blower at room temperature.

To be more specific, only in Comparative Example 2, the prior-stage cathodic electrolysis treatment, the anodic electrolysis treatment and the posterior-stage cathodic electrolysis treatment were conducted using a first solution (aqueous solution E), and then cathodic electrolysis treatment was conducted using a second solution (aqueous solution F). In the other examples, the prior-stage cathodic electrolysis treatment, the anodic electrolysis treatment and the posterior-stage cathodic electrolysis treatment were conducted using solely the first solution (relevant one out of aqueous solutions A to E).

Coating Weight

For each of the manufactured steel sheet for cans, the coating weight of the chromium metal layer (Cr metal layer) and the coating weight of the hydrated chromium oxide layer (hydrated Cr oxide layer) in terms of chromium amount (stated simply as "Coating weight" in Table 2 below) were measured. The measurement methods are as described above. The results are shown in Table 2 below.

Cr Metal Layer Structure

For the Cr metal layer of each of the manufactured steel sheet for cans, the thickness of the flat chromium metal layer (flat Cr metal layer) and the maximum diameter of the granular protrusions of the granular chromium metal layer (granular Cr metal layer) as well as the number density thereof per unit area were measured. The measurement methods are as described above. The results are shown in Table 2 below.

Evaluation

The manufactured steel sheets for cans were evaluated for the following factors. The evaluation results are shown in Table 2 below.

Rust Resistance

Two samples were cut out from each of the manufactured steel sheet for cans. One sample (30 mm×60 mm) was fixed to a rubbing tester for use as an evaluation sample, while the other sample (10 mm×10 mm) was fixed to a head, and the head was moved 10 strokes over a length of 60 mm at a surface pressure of 1 kgf/cm$^2$ and a rubbing rate of 1 second per reciprocation. Thereafter, the evaluation sample was allowed to stand in a constant temperature and humidity chamber at 40° C. and 80% RH for 7 days. Then, the evaluation sample was observed at low magnification with an optical microscope, and a micrograph thereof was subjected to image analysis to determine the rust occurrence area fraction of a rubbed portion. The evaluation was made according to the following criteria. For practical use, when the result is A, B or C, the steel sheet for cans can be rated as having excellent rust resistance.

A: Rust occurrence of less than 1%
B: Rust occurrence of not less than 1% but less than 2%
C: Rust occurrence of not less than 2% but less than 5%
D: Rust occurrence of not less than 5% but less than 10%
E: Rust occurrence of not less than 10% or rust occurrence at somewhere other than a rubbed portion Color Tone For each of the manufactured steel sheet for cans, the L value was measured according to the Hunter-type color difference measurement defined in JIS Z 8730 of old version (1980) and evaluated according to the following criteria. For practical use, when the result is A, B or C, the steel sheet for cans can be rated as having excellent surface appearance.

A: An L value of not less than 70
B: An L value of not less than 67 but less than 70
C: An L value of not less than 65 but less than 67
C-D: An L value of not less than 63 but less than 65
D: An L value of not less than 60 but less than 63
E: An L value of less than 60

Contact Resistance

Each of the manufactured steel sheet for cans was subjected to thermocompression bonding of an organic resin film and heat treatment for which posterior heating had been simulated, and then contact resistance was measured. More specifically, samples of each of the steel sheet for cans were separately passed through a film laminating device at a roll pressure of 4 kg/cm$^2$, a plate feed speed of 40 mpm, and a plate surface temperature after passing rolls of 160° C., and subjected to the posterior heating in a batch furnace (and retained at a target temperature of 210° C. for 120 seconds), whereafter the samples having undergone the posterior heating were superposed on each other. Subsequently, 1 mass % Cr—Cu electrodes of DR type were machined to a tip diameter of 6 mm and a curvature of R40 mm, the superposed samples were sandwiched by the electrodes and retained at a pressure of 1 kgf/cm$^2$ for 15 seconds, then 10 A current was supplied thereto, and the contact resistance between the sample plates was measured. The measurement was made for ten samples, and the average thereof was taken as a contact resistance value to be evaluated according to the following criteria. For practical use, when the result is A, B or C, the steel sheet for cans can be rated as having excellent weldability.

A: Contact resistance of not more than 50μΩ
B: Contact resistance of more than 50μΩ but not more than 100μΩ
C: Contact resistance of more than 100μΩ but not more than 300μΩ
D: Contact resistance of more than 300μΩ but not more than 1000μΩ
E: Contact resistance of more than 1000μΩ

TABLE 1

| Aqueous solution | Composition Whole | mol/L Cr | F |
|---|---|---|---|
| A | CrO$_3$ 0.5 mol/L<br>NaF 0.20 mol/L | 0.50 | 0.200 |
| B | CrO$_3$ 0.75 mol/L<br>NaF 0.20 mol/L | 0.75 | 0.200 |
| C | CrO$_3$ 1.0 mol/L<br>NaF 0.20 mol/L | 1.00 | 0.200 |
| D | CrO$_3$ 0.5 mol/L<br>NaF 0.10 mol/L | 0.50 | 0.100 |
| E | CrO$_3$ 0.8 mol/L<br>Na$_2$SiF$_6$ 0.011 mol/L | 0.80 | 0.064 |
| F | CrO$_3$ 0.4 mol/L<br>Na$_2$SiF$_6$ 0.001 mol/L | 0.40 | 0.005 |

TABLE 2

| | First solution | | | | | | | | | | |
|---|---|---|---|---|---|---|---|---|---|---|---|
| | | | Prior-stage cathodic electrolysis treatment | | | Anodic electrolysis treatment | | | Posterior-stage cathodic electrolysis treatment | | |
| | Aqueous solution | Temp. ° C. | Current density A/dm$^2$ | Current application time sec. | Electric quantity density C/dm$^2$ | Current density A/dm$^2$ | Current application time sec. | Electric quantity density C/dm$^2$ | Current density A/dm$^2$ | Current application time sec. | Electric quantity density C/dm$^2$ | Second solution Aqueous solution |
| EX 1 | A | 45 | 60 | 0.65 | 39 | 2 | 0.25 | 0.5 | 60 | 0.05 | 3 | — |
| EX 2 | A | 45 | 60 | 0.65 | 39 | 4 | 0.25 | 1 | 60 | 0.05 | 3 | — |
| EX 3 | A | 45 | 60 | 0.65 | 39 | 8 | 0.25 | 2 | 60 | 0.15 | 9 | — |
| EX 4 | A | 45 | 60 | 0.65 | 39 | 12 | 0.25 | 3 | 60 | 0.15 | 9 | — |
| EX 5 | A | 45 | 60 | 0.50 | 30 | 1 | 0.50 | 0.5 | 60 | 0.15 | 9 | — |
| EX 6 | A | 45 | 60 | 0.50 | 30 | 2 | 0.50 | 1 | 60 | 0.20 | 12 | — |
| EX 7 | A | 45 | 60 | 0.50 | 30 | 4 | 0.50 | 2 | 60 | 0.25 | 15 | — |
| EX 8 | B | 45 | 60 | 0.50 | 30 | 1 | 0.50 | 0.5 | 60 | 0.20 | 12 | — |
| EX 9 | B | 45 | 60 | 0.50 | 30 | 2 | 0.50 | 1 | 60 | 0.25 | 15 | — |
| EX 10 | B | 45 | 60 | 0.50 | 30 | 4 | 0.50 | 2 | 60 | 0.30 | 18 | — |
| EX 11 | C | 45 | 60 | 0.50 | 30 | 1 | 0.50 | 0.5 | 60 | 0.20 | 12 | — |
| EX 12 | C | 45 | 60 | 0.50 | 30 | 2 | 0.50 | 1 | 60 | 0.25 | 15 | — |

TABLE 2-continued

| | | | | | | | | | | | | |
|---|---|---|---|---|---|---|---|---|---|---|---|---|
| EX 13 | C | 45 | 60 | 0.50 | 30 | 4 | 0.50 | 2 | 60 | 0.30 | 18 | — |
| CE 1 | D | 45 | 60 | 0.50 | 30 | 2 | 0.50 | 1 | 60 | 0.25 | 15 | — |
| CE 2 | E | 50 | 80 | 0.30 | 24 | 5 | 0.50 | 2.5 | 40 | 0.50 | 20 | F |
| CE 3 | E | 50 | 40 | 0.70 | 28 | 5 | 0.20 | 1 | 50 | 0.20 | 10 | — |

| | Second solution | | | | | | | | | | |
|---|---|---|---|---|---|---|---|---|---|---|---|
| | Cathodic electrolysis treatment | | | Coating weight | | Cr metal layer structure | | | | | |
| | | | | | | Flat Cr metal | Granular Cr metal layer | | | | |
| | Temp. °C | Current density A/dm² | Current application time sec. | Electric quantity density C/dm² | Cr metal layer mg/m² | Hydrated Cr oxide layer mg/m² | layer Thickness nm | Maximum diameter nm | Density Protrusions/μm² | Rust Resistance | Color Toner | Contact resistance |
|---|---|---|---|---|---|---|---|---|---|---|---|---|
| EX 1 | — | — | — | — | 92 | 6 | 14.2 | 25 | 140 | A | A | A |
| EX 2 | — | — | — | — | 90 | 3 | 12.6 | 20 | 120 | A | A | A |
| EX 3 | — | — | — | — | 92 | 5 | 11.2 | 80 | 110 | A | B | A |
| EX 4 | — | — | — | — | 77 | 6 | 10.7 | 70 | 80 | A | B | A |
| EX 5 | — | — | — | — | 114 | 3 | 11.2 | 30 | 220 | A | A | A |
| EX 6 | — | — | — | — | 109 | 4 | 9.0 | 60 | 250 | B | B | A |
| EX 7 | — | — | — | — | 92 | 4 | 8.2 | 80 | 170 | C | B | A |
| EX 8 | — | — | — | — | 117 | 4 | 12.3 | 30 | 165 | A | A | A |
| EX 9 | — | — | — | — | 115 | 6 | 11.0 | 80 | 80 | A | B | A |
| EX 10 | — | — | — | — | 109 | 4 | 8.9 | 75 | 75 | C | B | A |
| EX 11 | — | — | — | — | 117 | 5 | 13.3 | 30 | 200 | A | A | A |
| EX 12 | — | — | — | — | 120 | 4 | 11.6 | 70 | 85 | A | B | A |
| EX 13 | — | — | — | — | 112 | 5 | 10.5 | 80 | 65 | A | B | A |
| CE 1 | — | — | — | — | 110 | 8 | 11.0 | 160 | 30 | A | E | A |
| CE 2 | 40 | 2 | 0.80 | 1.6 | 70 | 10 | 3.5 | 120 | 40 | E | C-D | A |
| CE 3 | — | — | — | — | 61 | 10 | 4.0 | 1000 | 12 | E | E | D |

EX: Example
CE: Comparative Example

As is evident from the results shown in Table 2, it was revealed that the steel sheet for cans of Examples 1 to 13 had excellent surface appearance.

In contrast, in Comparative Example 1 using the aqueous solution D (NaF: 0.10 mol/L), the maximum diameter per unit area of the granular protrusions of the granular chromium metal layer was 160 nm and thus large, resulting in poor surface appearance.

In Comparative Example 2 in which a series of electrolysis treatments (the prior-stage cathodic electrolysis treatment, anodic electrolysis treatment and posterior-stage cathodic electrolysis treatment) using the first solution was followed by cathodic electrolysis treatment using the second solution, for example, the maximum diameter of the granular protrusions of the granular chromium metal layer was 120 nm and thus large, resulting in poor surface appearance.

In Comparative Example 3, the maximum diameter of the granular protrusions of the granular chromium metal layer was 1000 nm and thus large, resulting in poor surface appearance.

The invention claimed is:

1. A steel sheet for cans comprising, on a surface of a steel sheet, a chromium metal layer and a hydrated chromium oxide layer stacked in this order from a steel sheet side,
wherein the chromium metal layer has a coating weight of 65 to 200 mg/m²,
the hydrated chromium oxide layer has a coating weight of 3 to 15 mg/m² in terms of chromium amount, and
the chromium metal layer includes:
a flat chromium metal layer with a thickness of not less than 7 nm; and
a granular chromium metal layer having granular protrusions formed on a surface of the flat chromium metal layer, the granular protrusions having a maximum diameter of not more than 100 nm and a number density per unit area of not less than 10 protrusions/μm².

2. The steel sheet according to claim 1, wherein the granular protrusions have a maximum diameter of not more than 50 nm.

3. The steel sheet according to claim 2, wherein the granular protrusions have a maximum diameter of not more than 30 nm.

4. The steel sheet according to claim 3, wherein the granular protrusions have a number density per unit area of not less than 50 protrusions/μm².

5. The steel sheet according to claim 4, wherein the granular protrusions have a number density per unit area of not less than 100 protrusions/μm².

6. The steel sheet according to claim 5, wherein the flat chromium metal layer has a thickness of not less than 10 nm.

7. The steel sheet according to claim 1, wherein the granular protrusions have a number density per unit area of not less than 50 protrusions/μm².

8. The steel sheet according to claim 7, wherein the granular protrusions have a number density per unit area of not less than 100 protrusions/μm².

9. The steel sheet according to claim 1, wherein the flat chromium metal layer has a thickness of not less than 10 nm.

10. A method of manufacturing the steel sheet according to claim 1, comprising:
subjecting a steel sheet to prior-stage cathodic electrolysis treatment with an aqueous solution that contains Cr in an amount of not less than 0.5 mol/L and F in an amount of more than 0.10 mol/L and is free of sulfuric acid except for sulfuric acid inevitably incorporated therein, followed by anodic electrolysis treatment at an electric quantity density of not less than 0.1 C/dm² but less than 5.0 C/dm², and then by posterior-stage cathodic electrolysis treatment.

11. The method according to claim 10, wherein the posterior-stage cathodic electrolysis treatment is a final electrolysis treatment.

12. The method according to claim 10, wherein the aqueous solution used in the prior-stage cathodic electrolysis treatment, the anodic electrolysis treatment and the posterior-stage cathodic electrolysis treatment comprises only one type of aqueous solution.

13. The method according to claim 11, wherein the aqueous solution used in the prior-stage cathodic electrolysis treatment, the anodic electrolysis treatment and the posterior-stage cathodic electrolysis treatment comprises only one type of aqueous solution.

14. A method of manufacturing the steel sheet according to claim 6, comprising:
    subjecting a steel sheet to prior-stage cathodic electrolysis treatment with an aqueous solution that contains Cr in an amount of not less than 0.5 mol/L and F in an amount of more than 0.10 mol/L and is free of sulfuric acid except for sulfuric acid inevitably incorporated therein, followed by anodic electrolysis treatment at an electric quantity density of not less than 0.1 $C/dm^2$ but less than 5.0 $C/dm^2$, and then by posterior-stage cathodic electrolysis treatment.

15. The method according to claim 14, wherein the posterior-stage cathodic electrolysis treatment is a final electrolysis treatment.

16. The method according to claim 14, wherein the aqueous solution used in the prior-stage cathodic electrolysis treatment, the anodic electrolysis treatment and the posterior-stage cathodic electrolysis treatment comprises only one type of aqueous solution.

17. The method according to claim 15, wherein the aqueous solution used in the prior-stage cathodic electrolysis treatment, the anodic electrolysis treatment and the posterior-stage cathodic electrolysis treatment comprises only one type of aqueous solution.

* * * * *